J. WHITLOCK.
Thill Coupling.
No. 78,848.
Patented June 9, 1868.
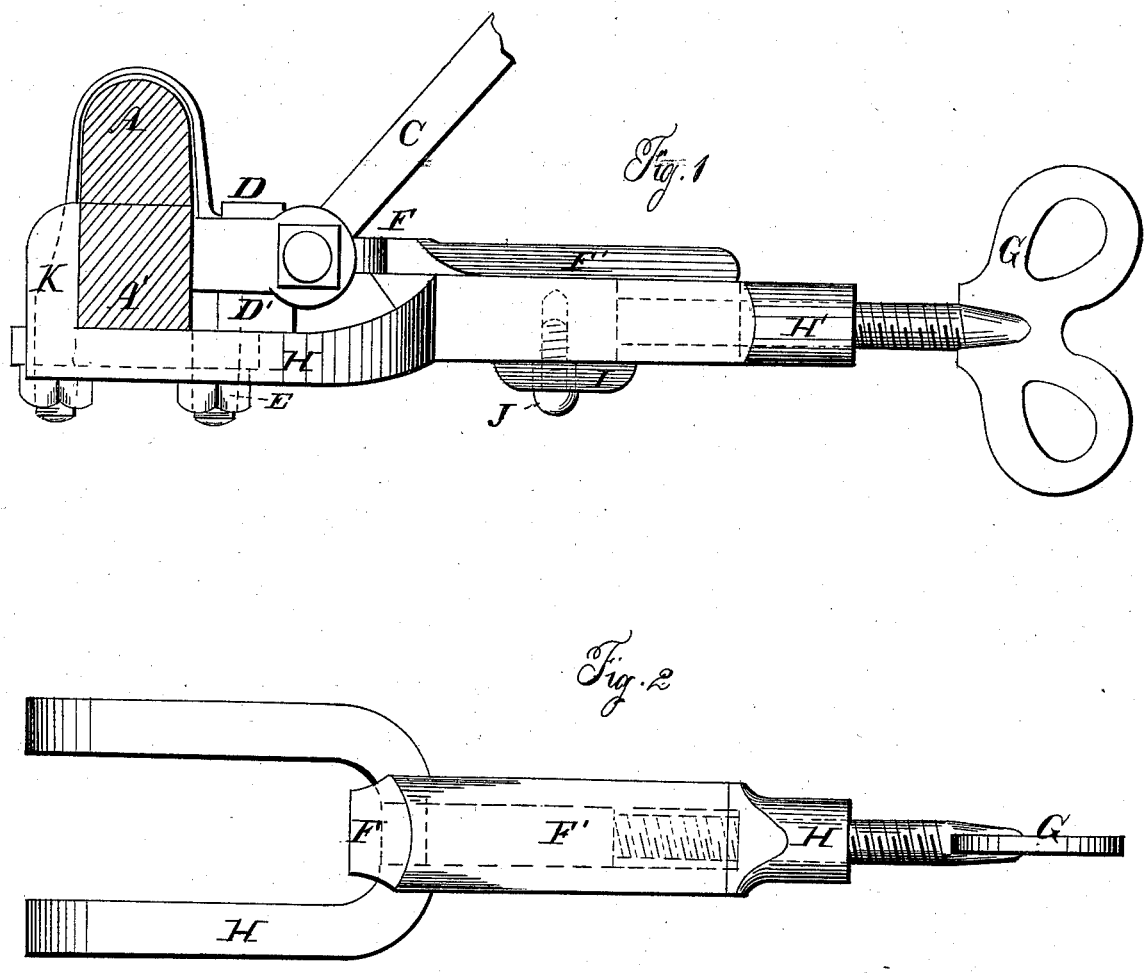

United States Patent Office.

JOHN WHITLOCK, OF BIRMINGHAM, CONNECTICUT.

Letters Patent No. 78,848, dated June 9, 1868.

IMPROVED SHACKLE-JACK.

The Schedule referred to in these Letters Patent and making part of the same.

Be it known that I, JOHN WHITLOCK, of Birmingham, county of New Haven, and State of Connecticut, have invented a new and useful implement, which I call a Shackle-Jack, and it is intended for compressing the India rubber or other elastic material used in carriages or other vehicles for the purpose of preventing noise and wear in the shackles which connect the shafts or thills or poles to the forward axle. In the accompanying drawings—

Figure 1 represents a section of a carriage-axle with the shackle-jack attached, wherein A A' is a section of the axle; B, the two ends of the shackle; B', shackle-bolt; C, the eye of shackle; D D', piece of India rubber or other elastic material; E E, two clip-nuts for holding the shackle on the axle.

The parts which I claim as new are, H H', frame of shackle-jack, with its forked end turned up behind the axle, as at K, fig. 1, and its opposite end tapered to receive the screw G. It also has a slot for receiving the slide F', which has a tenon sliding in it, and is retained in its place by the cap I and screw J.

The forward end of the slide F' is hollowed at F to receive the cylindrical part of the shackle-eye C, and carrying it straight forward against the rubber D D', in order to compress it by the screw G sufficiently to allow the bolt B' to enter the two parts of the shackle B and C and fastening them together.

Figure 2 represents the shackle-jack when detached from the shackle, and contains all of the parts which I claim to be new.

Having thus described my invention, what I claim therein as new, and desire to secure by Letters Patent, is—

The combination of the hook-frame H H' with the slide F' and the screw G, or their equivalents, for the purposes above described.

JOHN WHITLOCK.

Witnesses:
 JOSEPH TOMLINSON,
 GEO. C. ALLIS.